United States Patent
Mayhew

(10) Patent No.: US 12,513,371 B2
(45) Date of Patent: Dec. 30, 2025

(54) PLAYBACK OF MEDIA CONTENT DURING DUAL MODE TRICK PLAY OPERATIONS

(71) Applicant: Adeia Guides Inc., San Jose, CA (US)

(72) Inventor: Steven Mayhew, Cupertino, CA (US)

(73) Assignee: Adeia Guides Inc., San Jose, CA (US)

(*) Notice: Subject to any disclaimer, the term of this patent is extended or adjusted under 35 U.S.C. 154(b) by 0 days.

(21) Appl. No.: 18/229,835

(22) Filed: Aug. 3, 2023

(65) Prior Publication Data
US 2023/0379555 A1    Nov. 23, 2023

Related U.S. Application Data

(63) Continuation of application No. 17/171,140, filed on Feb. 9, 2021, now Pat. No. 11,765,443.

(51) Int. Cl.
| | | |
|---|---|---|
| H04N 21/2387 | (2011.01) | |
| H04N 21/472 | (2011.01) | |
| H04N 21/6587 | (2011.01) | |
| H04N 21/845 | (2011.01) | |

(52) U.S. Cl.
CPC ..... *H04N 21/8455* (2013.01); *H04N 21/2387* (2013.01); *H04N 21/47217* (2013.01); *H04N 21/6587* (2013.01); *H04N 21/8456* (2013.01)

(58) Field of Classification Search
CPC .......... H04N 21/8455; H04N 21/2387; H04N 21/47217; H04N 21/6587; H04N 21/8456
See application file for complete search history.

(56) References Cited

U.S. PATENT DOCUMENTS

| | | | |
|---|---|---|---|
| 7,761,892 B2 | 7/2010 | Ellis et al. | |
| 8,856,283 B2 | 10/2014 | Biderman et al. | |
| 10,412,391 B1* | 9/2019 | Balannik | H04N 19/142 |
| 2007/0025687 A1* | 2/2007 | Kim | H04N 5/783 |
| | | | 386/E5.052 |
| 2009/0110371 A1* | 4/2009 | Akimoto | H04N 9/8042 |
| | | | 386/344 |
| 2014/0247885 A1 | 9/2014 | Brueck et al. | |
| 2015/0350700 A1* | 12/2015 | Pantos | H04N 21/631 |
| | | | 725/90 |
| 2018/0014041 A1* | 1/2018 | Chen | H04L 65/612 |
| 2022/0103883 A1* | 3/2022 | Cunningham | H04N 21/434 |
| 2022/0256252 A1 | 8/2022 | Mayhew | |

OTHER PUBLICATIONS

Kilroy Hughes, "IPI3053—Trick Mode Contribution", DVB, (2013), Retrieved from the Internet: https://www.dvb.org/resources/restricted/m embers/documents/TM -IPI/TM-IPI3053 -DASH%20 Trick%20Play.pptx [retrieved on Jul. 24, 2013].

* cited by examiner

*Primary Examiner* — Thai Q Tran
*Assistant Examiner* — Jose M Mesa
(74) *Attorney, Agent, or Firm* — Haley Guiliano LLP

(57) ABSTRACT

Systems and methods are described herein for playback of streaming media content during a dual mode trick play operation. An I-frame only playlist is generated from a media content stream. The I-frame only playlist includes a plurality of I-frames. A set of I-frames are selected from the plurality of I-frames for scan play back mode based on metadata associated with the media content stream. A curated I-frame only playlist of the selected set of I-frames is generated for display during scan play back mode. In one embodiment, the selected set of I-frames is an I-frame identified at the beginning of each of the segments.

20 Claims, 8 Drawing Sheets

PLAYBACK OF MEDIA CONTENT DURING DUAL MODE TRICK PLAY OPERATIONS

CROSS-REFERENCE TO RELATED APPLICATION

This application is a continuation of U.S. patent application Ser. No. 17/171,140, filed Feb. 9, 2021, the disclosure of which is hereby incorporated by reference herein in its entirety.

BACKGROUND

The present disclosure relates to playback of media content and, more particularly, playback of streaming media content during a dual mode trick play operation.

SUMMARY

Many times, during real-time streaming of media content, a user may wish to skip ahead past portions (fast forward) of the media content or go back (rewind) to review an earlier portion of the media content. Such skipping, including fast-forward and rewind operations, is commonly known as "trick play" mode playback. Traditionally, such trick play mode playback is enabled by generating an I-frame only playlist from an original playlist to present a fast playback experience with the media content. Original playlist includes multiple segments each of which contain multiple I-frames and data corresponding to each of the I-frames in the segments. I-frame only playlist includes URLs that refer to only I-frames, also known as instantaneous decoder refresh (IDR), which are intra-coded frames that can be decoded independently of other video frames. I-frame only playlist is desirable since a user can start playback with and display an entire single high resolution frame of video with just one IDR. However, not all service providers provide the I-frame only playlist required for the trick play mode. Also, much of legacy media content may not be digitally converted with the I-frame only playlist and if a user device supports high speed trick play from the I-frame only stream, then the user device depends on the I-frame only playlist to perform trick play mode playback.

The trick play mode playback includes two types of modes. One such mode is called a scrub mode in which a user individually fast forwards/fast reverses one I-frame at a time, which results in individual high resolution frames being displayed at a pace controlled by user's input. Another mode is scan mode in which the system automatically fast forwards/fast reverses by skipping through tons of I-frames, resulting in frames being skipped at a high speed. A decoder processes the I-frames in both the scrub mode and the scan mode to generate high resolution frames. During scrub mode, such high resolution frames are needed in order for the user to identify/comprehend the frames for playback. However, in the scrub mode, the user does not need such high resolution since the system automatically sets the number of frames to skip in pre-determined time intervals of which the user has no control. Thus, each of the I-frames is processed by the decoder in the scan mode resulting in a much slower and inefficient overall system.

In some embodiments, systems and methods are described herein for curating the I-frames for processing during the scan-mode. Such selection would generate a set of I-frames that are tuned to high speed playback with a high density of frames. In one embodiment, the system selects the I-frames based on parameters such as scene change detection in the I-frame, start and end of a scene in the I-frame, interval detection in the I-frame, size of the I-frame, random I-frame, etc.

Additionally, the I-frame only playlist includes all the I-frames from each of the multiple segments, which utilizes a lot of unnecessary bandwidth and takes a lot of time fetching for relevant I-frames during trick play mode playback. In some embodiments, systems and methods are described herein for simulating an I-frame only playback from the original playlist by generating an internal I-frame only variant, which selects only the I-frame from the beginning of each segment in the original playlist and discards the rest of the I-frames in each of the segments resulting in a reduction in bandwidth and time required to fetch the relevant I-frames.

In one embodiment, the I-frame only playlist is selected regardless of video speed (frame rate) for each of the I-frames generated in the I-frame only playlist.

In one embodiment, the system determines a switch in the playback from the scan mode to the scrub mode. The system replaces the curated I-frame only playlist with the I-frame only playlist for display in the scrub mode.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
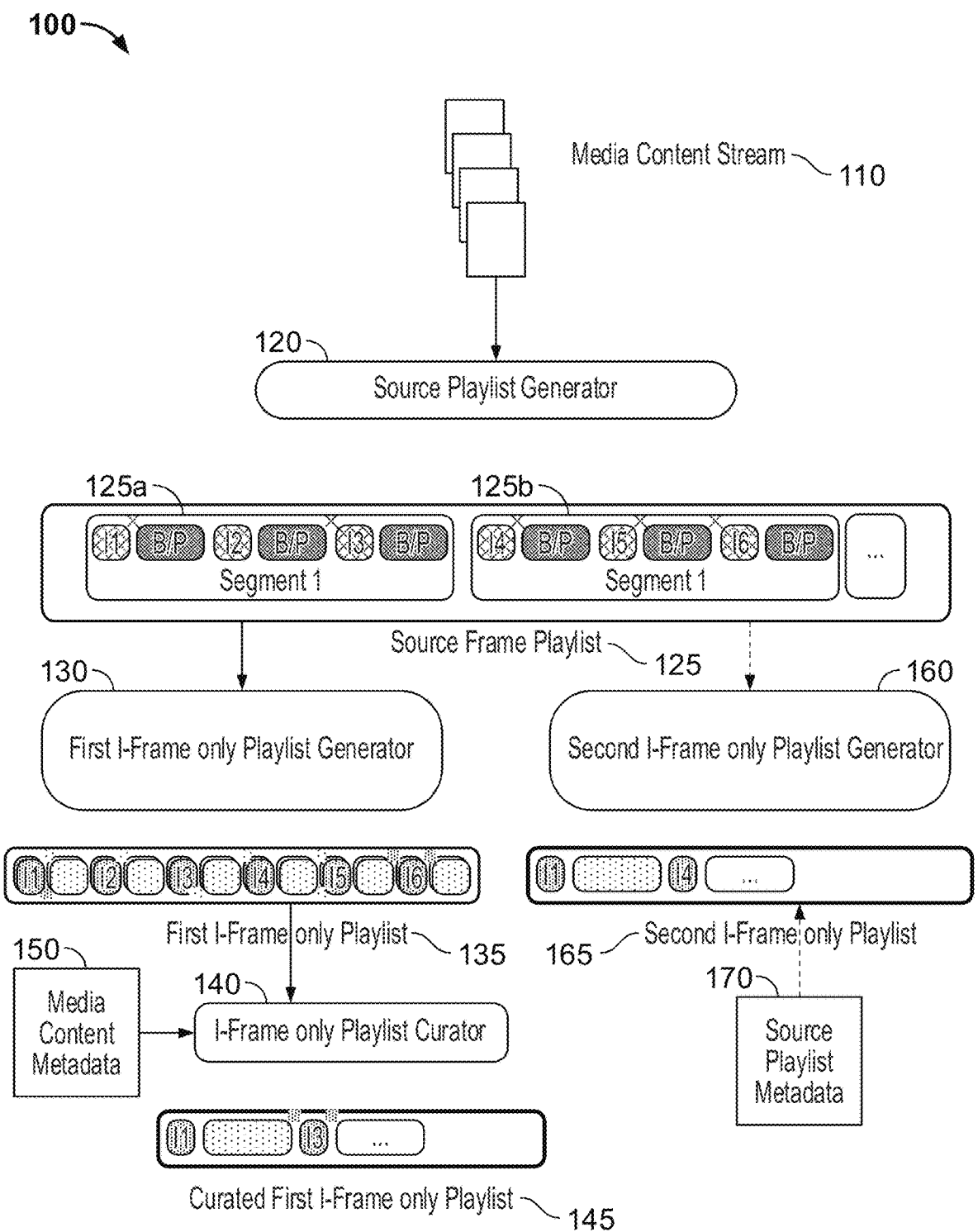
FIG. 1 shows an illustrative flowchart of a system for generating an I-frame only playlist and I-frame only playlist curator for dual mode trick play back operations according to some embodiments of the disclosure.

FIG. 1 shows an illustrative flowchart of a system 100 for generating an I-frame only playlist and I-frame only curator playlist of media content according to some embodiments of the disclosure. Some examples of media content include audio, video, text, AR, VR, etc. In one embodiment, a media content stream 110 is received by a source playlist generator 120. In one embodiment the media content stream 10 includes media frames (e.g. video frames). The source playlist generator 120 generates a source playlist 125 including a group of pictures (GOPs). Each of the GOPs includes a single I-frame and corresponding B/P frame. As discussed above, I-frame is an intra-coded frame, which is a complete standalone frame that can be decoded independently of other video frames. P-frame is a predicted frame, which includes only the changes in the image in the current frame from the previous frame. B-frame is a bidirectional predicted frame that includes changes in the image between the current frame and the previous frame and changes in the image between the current frame and the following frame. The source playlist 125 is broadcasted at a normal video speed (a.k.a frame rate) of one frame per one second.

In one embodiment, the source playlist 125 is sent to a first I-frame only playlist generator 130, which functions as a decoder by decoding selected frames in the source playlist. In one embodiment, the I-frame only playlist generator 130 discards the B-frames and the P-frames to generate an I-frame only playlist 135 including only the I-frames. As shown, the I-frame only playlist 135 includes only the I-frames, I1, I2, I3, I4, I5, I6, etc. Such I-frames are high density frames. In one embodiment, the I-frame only playlist 135 is generated to render video at a speed higher than a normal speed. In one embodiment, the I-frame only playlist 135 maintains the video speed of trick play in the scrub playback mode. In one example, the video speed in the scrub playback mode is generally at a range of 5-15 frames per second. In one embodiment, the I-frame only playlist is sent to an I-frame only playlist curator 140. The I-frame only playlist curator 140 accesses media content metadata 150 to select I-frames from the I-frame only playlist 135 to generate curated I-frame only playlist 145. The media content metadata 150 includes data corresponding to media content. Such metadata includes identification of frames associated with a scene change in media content, identification of frames associated with beginning and end of the scene, identification of frames associated with advertisements in the media content, identification of frame associated with time intervals in the media content, size of the frames of the media content, and random frames of the media content. In one embodiment, the media content metadata 150 does not include In one embodiment, the I-frame only playlist curator 140 selects the I-frames from the I-frame only playlist 135 based on the media content metadata 150. In one example, the I2, which is an I-frame between I1 and I3 of the media content includes advertisement, the I-frame only playlist curator 140 will only select I1 and I3 and discard I2. Thus, the curated I-frame only playlist 145 includes only I1 and I3 frames. In one embodiment, the curated I-frame only playlist 145 is generated to render selective high density frames at a high speed playback during scan mode regardless of the frame rate. For example, the I-frame only playlist curator 140 generates the curated I-frame only playlist 145 including the selected I-frames, I1 and I3 to be downloaded for display during high speed scan playback mode regardless of the frame rate. In one example, the video speed in the scan playback mode is generally at a rate of 15×-60× normal playback speed.

In some embodiments, source playlist 125 is sent to a second I-frame only playlist generator 160, which also functions as a decoder by decoding selected frames in the source playlist. In one embodiment, the source playlist 124 accesses source playlist metadata 170 to select I-frames from the I-frame only playlist 135 to generate second I-frame only playlist 165. The source playlist metadata 170 includes addresses of all the segments in the source playlist for a time period and an identifier that indicates all segments must begin with an I-Frame. As discussed above, source frame playlist 125 includes GOPs, each of which includes a single I-frame and corresponding B/P frame. Thus, source frame playlist 125 includes at least six GOPs. Segments of the source playlist are often divided into an even number of GOPs as long as they begin with the I-frame. In one example, the source frame playlist 125 includes at least two segments such that a first segment 125a among the two segments includes I1 B/P, I2 B/P and I3 B/P frames and a second segment 125b among the two segments includes I4 B/P, I5 B/P and I6 B/P frames. Thus, I1 is the I-frame identified at the beginning of the first segment 125a and I-4 is the I-frame identified at the beginning of the second segment 125. In one example, the source playlist metadata 170 includes addresses of at least two segments 125a and 125b in the source frame playlist 125 and an identifier assigned to the I1 and the I4. In one embodiment, the second I-frame only playlist generator 160 may access the source playlist metadata 170 to identify each I-frame at beginning of each of the segments 125a and 125b of the source frame playlist 125. In one embodiment, the second I-frame only playlist generator 160 fetches for all the I-frames assigned with the identifier and discards all the rest of the frames in each of the segments. Thus, the second I-frame only playlist generator 160 fetches in the source frame playlist 125, the I-frames I1 and I4, discards the corresponding B/P frames and also discards all the I2, I3, I5 and I6 frames including their corresponding B/P frames. Thus, the second I-frame only playlist 165 includes only I1 and 14 frames. In one embodiment, the second I-frame only playlist 165 is generated to render specific high density frames at a high speed playback during scan mode regardless of the frame rate. For example, the I-frame only playlist curator 140 generates the second I-frame only playlist 165 including the specific I-frames, I1 and I4 to be downloaded for display during high speed scan playback mode regardless of the frame rate. In one example, the video speed in the scan playback mode is generally at a rate of 15×-60× normal playback speed.

Figure 2A:
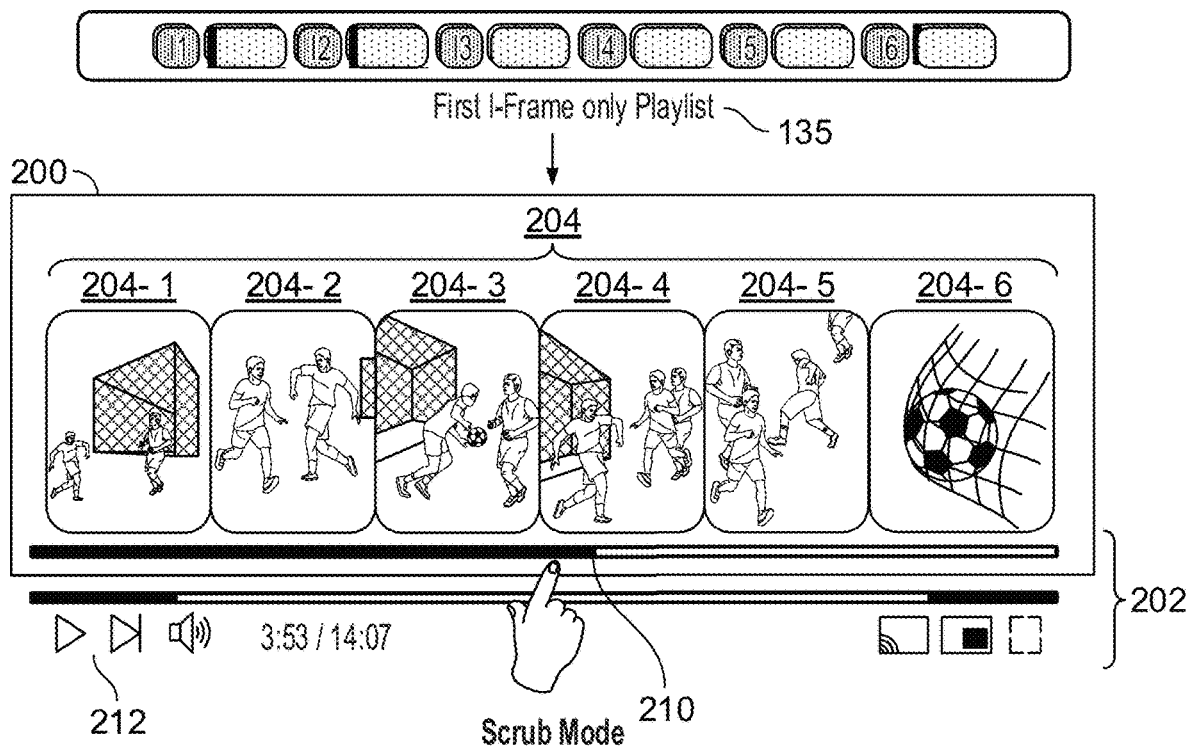
FIG. 2A shows an exemplary display of a user interface for a scrub trick play back mode utilizing the I-frame only playlist, in accordance with an embodiment of the disclosure.
Figure 2B:
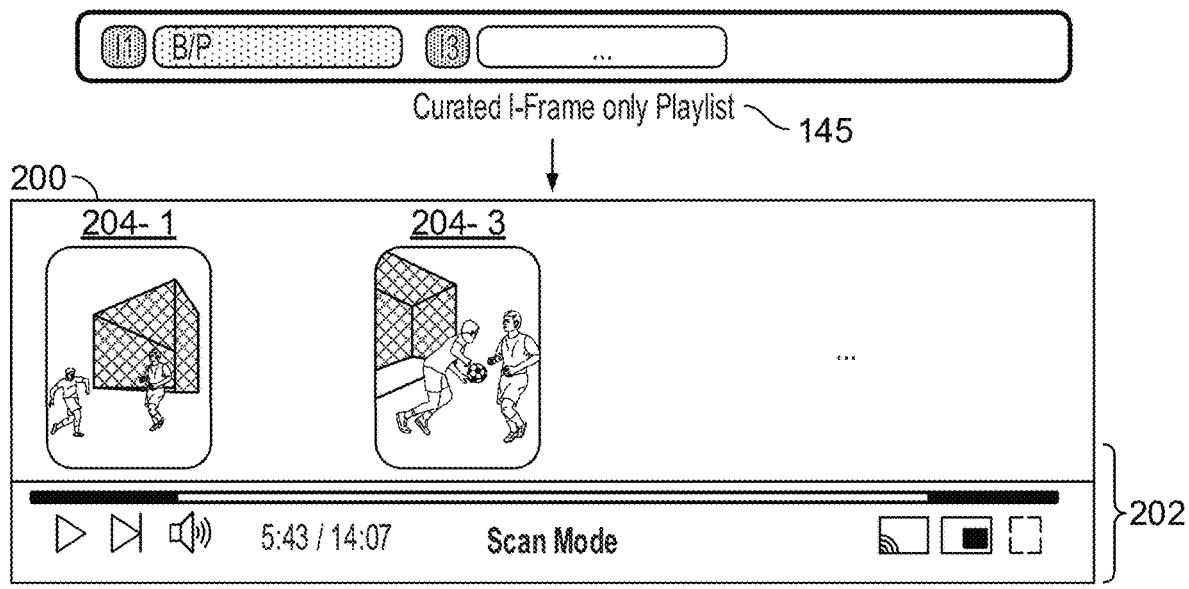
FIG. 2B shows an exemplary display of a user interface for a scan trick play back mode utilizing the curated I-frame playlist, in accordance with an embodiment of the disclosure.

FIGS. 2A and 2B shows an exemplary display 200 and user interface 202 for playback of streaming media content during a dual mode trick play operation, in accordance with some embodiments of the disclosure. Display 200 may be any display device, such as a television, a computer monitor, or a touchscreen such as is found on a tablet or smartphone device. A fast forward indicator 212 of a progress bar 210 is depicted on the bottom of the display 200. Specifically, FIG. 2A shows a user interface for a scrub mode trick play back operation. A video content 204 for example includes a video playlist of video frames 204-1, 204-2, 204-3, 204-5, 204-6. As shown, the video playlist is being fast forwarded by a user indicating that the trick play operation is in a scrub playback mode. As discussed above, in the scrub playback mode, the user manually presses and drags (move while holding down) the progress bar 210 to stepwise forward and rewind the playlist. In one embodiment, the first I-frame only playlist 135 is utilized to maintain the speed of trick play in the scrub playback mode. In one embodiment, all the I-frames (I1, I2, I3, I4, I5 and I6) from the first I-frame only playlist 135 are downloaded and displayed as the video frames 204-1, 204-2, 204-3, 204-5 and 204-6 respectively at a time when the user fast forwards in the scrub mode. In one embodiment, the trick play operation is switched to a scan mode in which the system automatically fast forwards the video playlist by skipping through many video frames resulting in a high speed playback mode. FIG. 2B shows a user interface for a scan mode trick playback operation. As discussed above, in the scan mode, a user may press the progress bar 210 only once and the playlist is automatically fast forwarded/fast rewind. In one embodiment, the curated I-frame only playlist 135 including only the I1 and I3 frames, is utilized for the high speed of the trick play in scan mode. Thus, only the I1 and I3 frames are downloaded and displayed as video frames 204-1 and 204-3 respectively in the scan mode.

Figure 3:
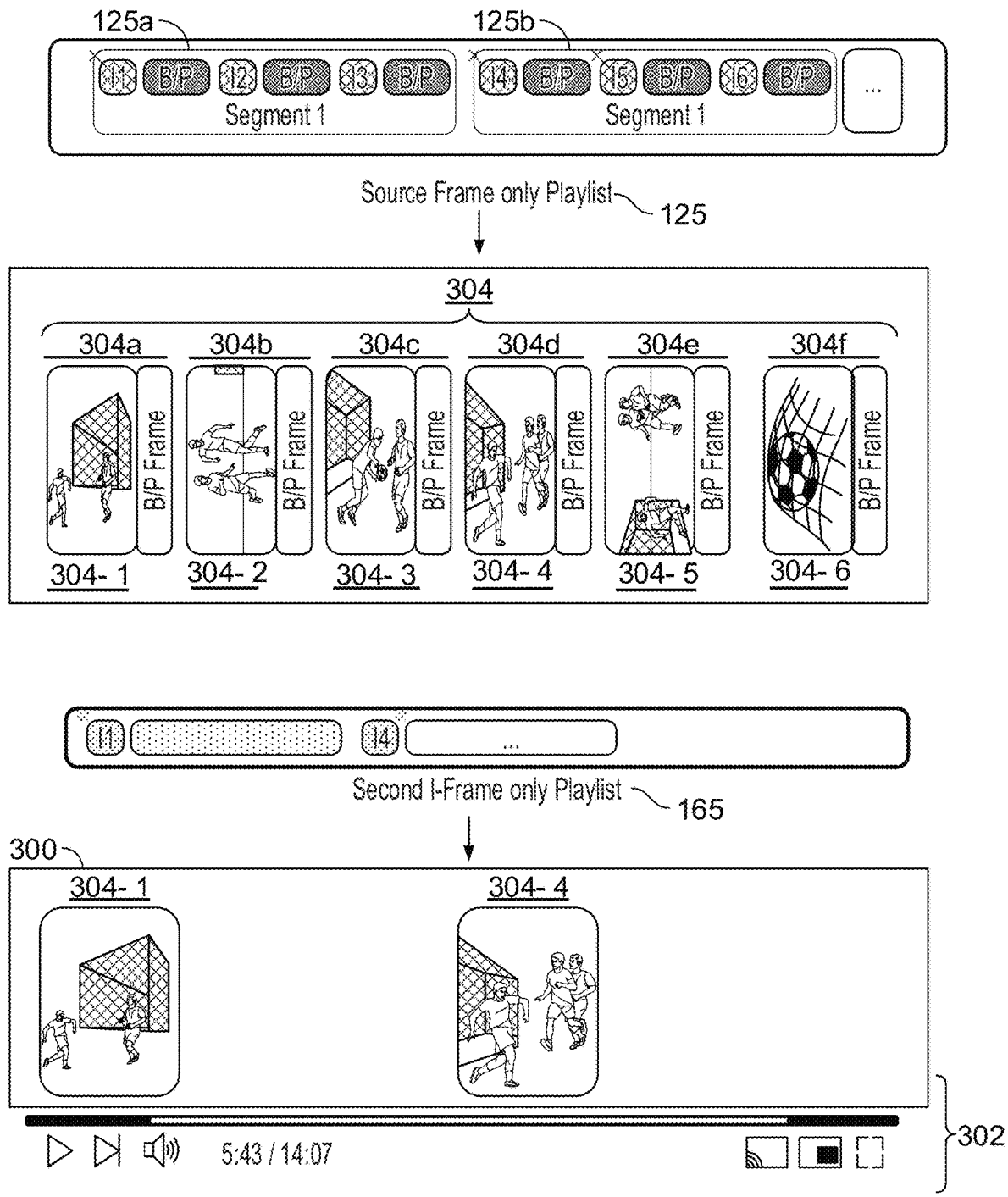
FIG. 3 shows an exemplary display of a user interface for scan trick playback mode in accordance with an embodiment of the disclosure.

FIG. 3 shows an exemplary display 300 and a user interface 302 for playback of streaming media content during a scan mode trick playback operation in accordance with another embodiment of the present invention. The user interface 302 is similar to the user interface 202 in FIG. 2B. As shown, the source frame playlist 125 includes all the I-frames I1, I2, I3, I4, I5, I6 and their respective B/P frames. Also, as shown is the first segment 125*a* including I-frames I1, I2, I3 and their respective B/P frames and the second segment 125*b* including I-frames I4, I5, I6 and their respective B/P frames. In one embodiment, a video content 304 for example includes a video playlist of video frames 304*a*, 304*b*, 304*c*, 304*d*, 304*e* and 304*f*, each of which includes 304-1, 304-2, 304-3, 304-5, 304-6 I-frames and their respective B/P frames. Each of the frames 304-1, 304-2, 304-3 corresponds to I1, I2 and I3 frames respectively in the first segment 125*a* and the B/P frames associated with each of the I-frames 304-1, 304-2 and 304-3 correspond to the B/P frames associated with each of the I1, I2 and I3 frames respectively. Similarly, each of the frames 304-3, 304-5, 304-6 correspond to the I4, I5 and I6 frames respectively in the second segment 125*b* and each of the B/P frames associated with each of the frames 304-4, 304-5 and 304-6 correspond to the B/P frames associated with each of the I4, I5 and I6 frames respectively. In one embodiment, the trick play operation is in a scan mode in which the system automatically fast forwards the video playlist by skipping through many video frames resulting in a high speed playback mode. In one embodiment, the second I-frame only playlist 165 including only the I1 and I4 frames is utilized for the high speed of the trick play in scan mode. Thus, only the I1 and I4 frames are downloaded and displayed as video frames 304-1 and 304-4 respectively in the scan mode.

Figure 4:
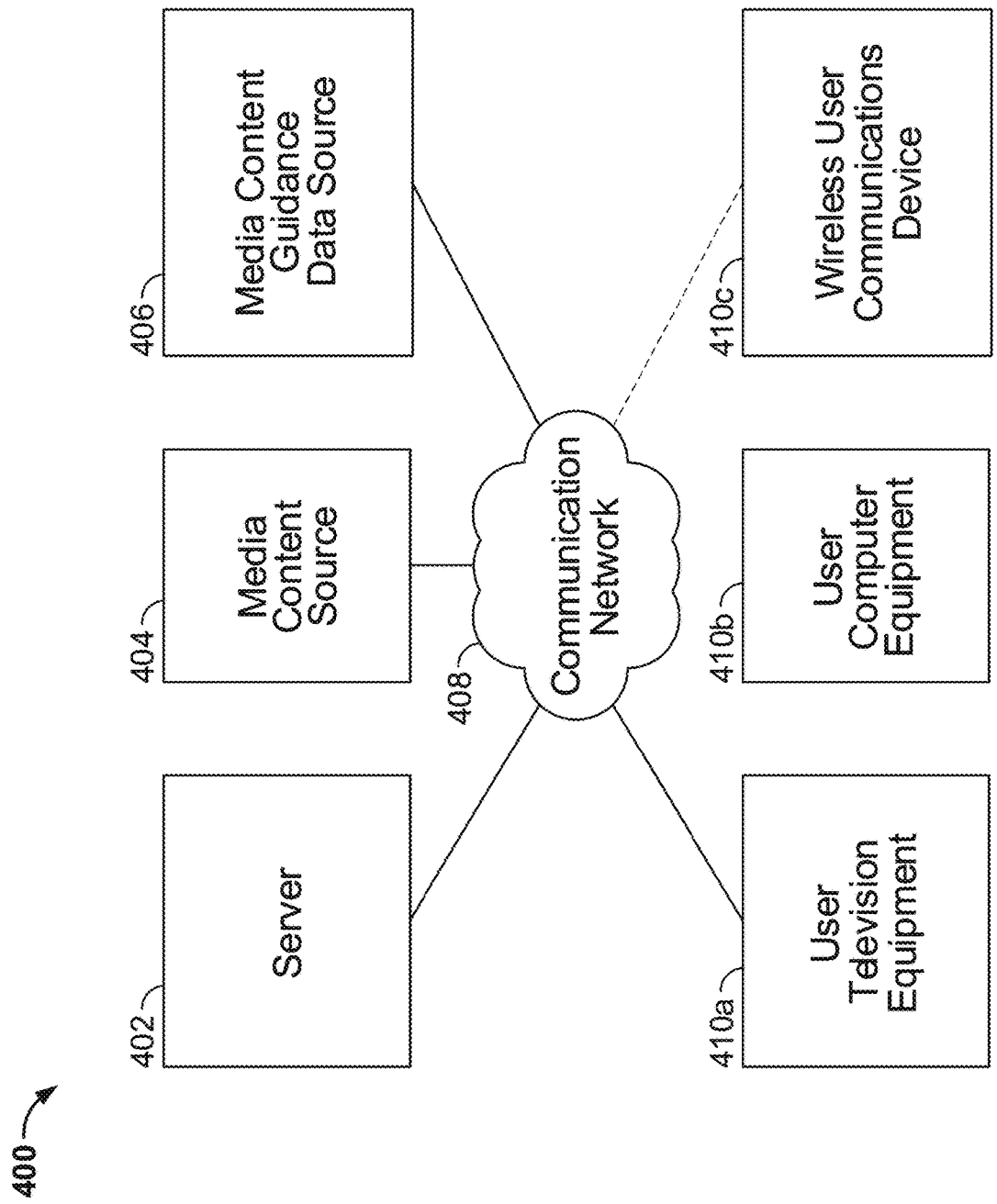
FIG. 4 shows an illustrative block diagram of a system hosting playback of media content during a dual mode trick play application, in accordance with some embodiments of the disclosure.

FIG. 4 shows an illustrative block diagram of a system 400 for displaying content item based on content item recommendation, in accordance with some embodiments of the disclosure. In various aspects, system 400 includes one or more of server 402, content item source 404, content item guidance data source 406, communication network 408, and one or more computing devices 410, such as user television equipment 410*a* (e.g., a set-top box), user computer equipment 410*b* (e.g., a laptop), and/or wireless user communications device 410*c* (e.g., a smartphone device). Although FIG. 4 shows one of each component, in various examples, system 400 may include fewer than the illustrated components and/or multiples of one or more illustrated components. Communication network 408 may be any type of communication network, such as the Internet, a mobile phone network, mobile voice or data network (e.g., a 4G or LTE network), cable network, public switched telephone network, or any combination of two or more of such communication networks. Communication network 408 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 408 communicatively couples various components of system 400 to one another. For instance, server 402 may be communicatively coupled to content item source 404, content item guidance data source 406, and/or computing device 410 via communication network 408.

In some examples, content item source 404 and content item guidance data source 406 may be integrated as one device. Content item source 404 may include one or more types of content item distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content item providers. NBC is a trademark owned by the National Broadcasting Company, Inc.; ABC is a trademark owned by the American Broadcasting Company, Inc.; and HBO is a trademark owned by the Home Box Office, Inc. Content item source 404 may be the originator of content item (e.g., a television broadcaster, a Webcast provider, etc.) or may not be the originator of content item (e.g., an on-demand content item provider, an Internet provider of content item of broadcast programs for downloading, etc.). Content item source 404 may include cable sources, satellite providers, on-demand providers, Internet providers, over-the-top content item providers, or other providers of content. Content item source 404 may also include a remote media server used to store different types of content item (e.g., including video content item selected by a user) in a location remote from computing device 410. Systems and methods for remote storage of content item and providing remotely stored content item to user equipment are discussed in greater detail in connection with Ellis et al., U.S. Pat. No. 7,761,892, issued Jul. 20, 2010, which is hereby incorporated by reference herein in its entirety.

Content item source 404 and content item guidance data source 406 may provide content item and/or content item guidance data to computing device 410 and/or server 402 using any suitable approach. In some embodiments, content item guidance data source 406 may provide a stand-alone interactive television program guide that receives program guide data via a data feed (e.g., a continuous feed or trickle feed). In some examples, content item guidance data source 406 may provide program schedule data and other guidance data to computing device 410 on a television channel sideband, using an in-band digital signal, an out-of-band digital signal, or any other suitable data transmission technique.

As described in further detail below, server 402 manages the communication of a live content item stream (e.g., a live sporting event broadcast, a live news broadcast, or the like) and recorded streams from content item source 404 to computing device 410 via communication network 408. For instance, in some embodiments, content item from content item source 404 and/or guidance data from content item guidance data source 406 may be provided to computing device 410 using a client/server approach. In such examples, computing device 410 may pull content item and/or content item guidance data from server 402 and/or server 402 may push content item and/or content item guidance data to computing device 410. In some embodiments, a client application residing on computing device 410 may initiate sessions with server 402, content item source 404, and/or content item guidance data source 406 to obtain content item and/or guidance data when needed, e.g., when the guidance data is out of date or when computing device 410 receives a request from the user to receive content item or guidance data. In various aspects, server 402 may also be configured to detect events within the live content item stream and, based on the detected events, control the display of content item and/or navigation menu options via computing device 410. Additionally, although FIG. 4 shows content item source 404 and content item guidance data source 406 as separate from server 402, in some embodiments, content item source 404 and/or content item guidance data source 406 may be integrated as one device with server 402.

Content item and/or content item guidance data delivered to computing device 410 may be over-the-top (OTT) content. OTT content item delivery allows Internet-enabled user devices, such as computing device 410, to receive content item that is transferred over the Internet, including any content item described above, in addition to content item received over cable or satellite connections. OTT content item is delivered via an Internet connection provided by an Internet service provider (ISP), but a third party distributes the content. The ISP may not be responsible for the viewing abilities, copyrights, or redistribution of the content, and may transfer only IP packets provided by the OTT content item provider. Examples of OTT content item providers include FACEBOOK, AMAZON, YOUTUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content item providers may also include any other OTT content item provider. OTT content item providers may additionally or alternatively provide content item guidance data described above. In addition to content item and/or content item guidance data, providers of OTT content item can distribute applications (e.g., web-based applications or cloud-based applications), or the content item can be displayed by applications stored on computing device 410.

Figure 5:
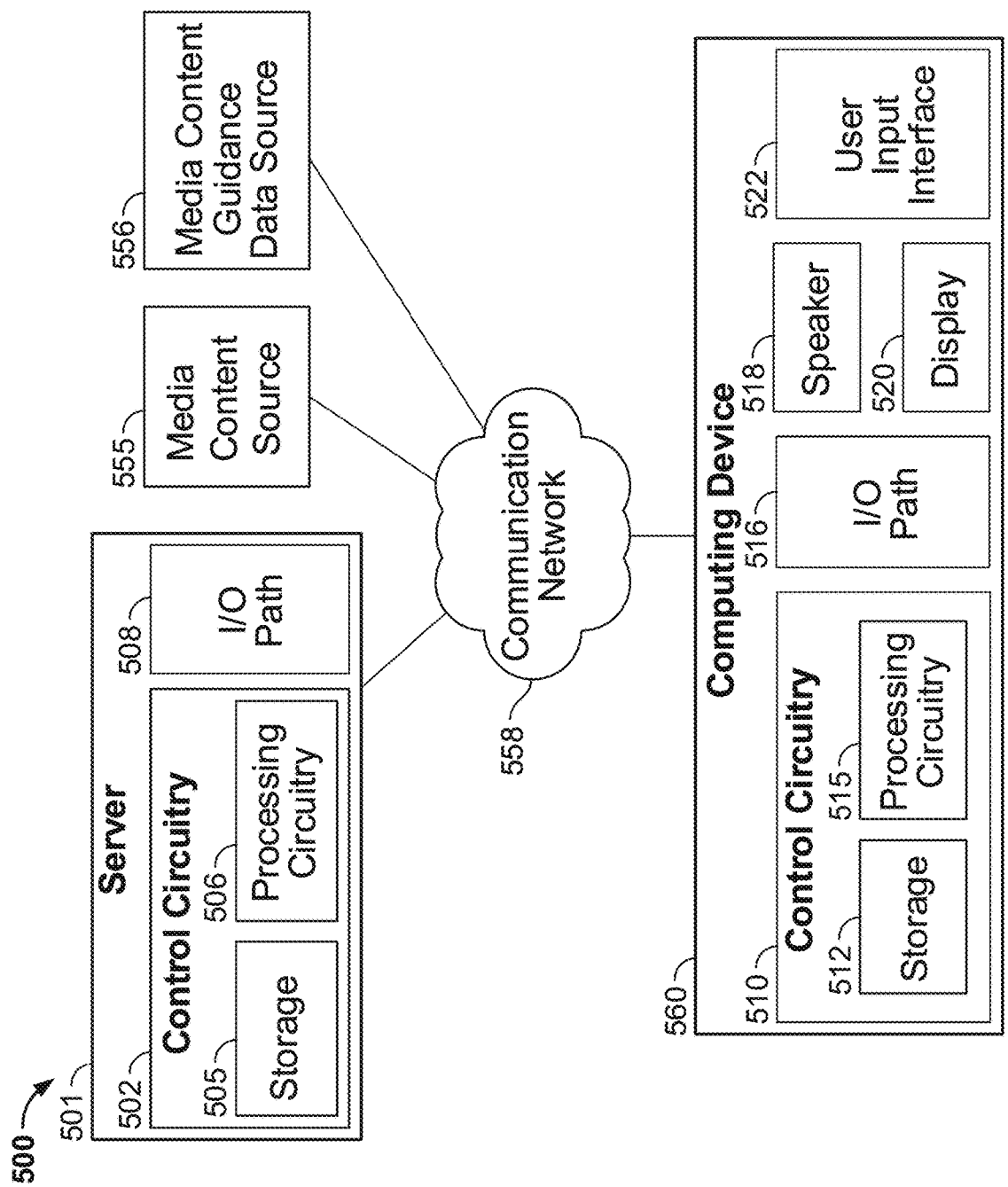
FIG. 5 is an illustrative block diagram showing additional details of a system hosting playback of media content during a dual mode trick play application, in accordance with some embodiments of the disclosure.

FIG. 5 is an illustrative block diagram showing additional details of the system 500, in accordance with some embodiments of the disclosure. In particular, server 501 (e.g., the same server as server 402) includes control circuitry 502 and an input/output I/O circuitry 508, and control circuitry 502 includes storage 505 and processing circuitry 506. In one embodiment, the storage 504 includes non-transitory storage instructions that when executed by the processing circuitry 506 cause dual mode trick play applications as described in FIGS. 1, 2 and 3 above. Computing device 560 (e.g., one or more of devices 510a, 510b, and 510c) includes control circuitry 510, I/O circuitry 516, speaker 518, display 520, and user input interface 522. Control circuitry 510 includes storage 512 and processing circuitry 514. Control circuitry 502 and/or 510 may be based on any suitable processing circuitry such as processing circuitry 506 and/or 514. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 504, storage 512, and/or storages of other components of system 500 (e.g., storages of content item source 554, content item guidance data source 556, and/or the like) may be an electronic storage device. In some embodiments, content item source 554 may be the same as content item source 404. In some embodiments, content item guidance data source 556 may be the same as content item source 406. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 504, storage 512, and/or storages of other components of system 500 may be used to store various types of content, content item guidance data, and or other types of data. Non-volatile memory may also be used (e.g., to launch a boot-up routine and other instructions). Cloud-based storage may be used to supplement storages 504, 512 or instead of storages 504, 512. In some embodiments, control circuitry 502 and/or 510 executes instructions for a content item recommendation application stored in memory (e.g., storage 504 and/or 512). Specifically, control circuitry 502 and/or 510 may be instructed by the content item recommendation application to perform the functions discussed herein. In some implementations, any action performed by control circuitry 502 and/or 510 may be based on instructions received from the content item recommendation application. For example, the content item recommendation application may be implemented as software or a set of executable instructions that may be stored in storage 504 and/or 512 and executed by control circuitry 502 and/or 510. In some embodiments, the content item recommendation application may be a client/server content item recommendation application where only a client content item recommendation application resides on computing device 560, and a server content item recommendation application resides on server 501.

The content item recommendation application may be implemented using any suitable architecture. For example, it may be a stand-alone content item recommendation application wholly implemented on computing device 560. In such an approach, instructions for the content item recommendation application are stored locally (e.g., in storage 512), and data for use by the content item recommendation application is downloaded on a periodic basis (e.g., from an out-of-band feed, from an Internet resource, or using another suitable approach). Control circuitry 510 may retrieve instructions for the content item recommendation application from storage 512 and process the instructions to perform the functionality described herein. Based on the processed instructions, control circuitry 510 may determine what action to perform when input is received from user input interface 522.

In client/server-based embodiments, control circuitry 510 may include communication circuitry suitable for communicating with a content item recommendation application server (e.g., server 501) or other networks or servers. The instructions for carrying out the functionality described herein may be stored on the application server. Communication circuitry may include a cable modem, an integrated service digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 558). In some embodiments, communication network 558 may be the same as network 308. In another example of a client/server-based application, control circuitry 510 runs a web browser that interprets web pages provided by a remote server (e.g., server 501). For example, the remote server may store the instructions for the application in a storage device. The remote server may process the stored instructions using circuitry (e.g., control circuitry 502) and generate the displays discussed above and below. Computing device 560 may receive the displays generated by the remote server and may display the content item of the displays locally via display 520. This way, the processing of the instructions is performed remotely (e.g., by server 501) while the resulting displays, such as the display windows described elsewhere herein, are provided locally on computing device 560. For example, computing device 560 may include display circuitry (e.g., video card circuitry or combination motherboard and video card circuitry) configured to generate for display the display windows. Computing device 560 may receive inputs from the user via input interface 522 and transmit those inputs to the remote server for processing and generating the corresponding displays.

A user may send instructions to control circuitry 502 and/or 510 using user input interface 522. User input interface 522 may be any suitable user interface, such as a remote control, trackball, keypad, keyboard, touchscreen, touchpad, stylus input, joystick, voice recognition interface, or other user input interfaces. User input interface 522 may be integrated with or combined with display 520, which may be a monitor, television, liquid crystal display (LCD), electronic ink display, or any other equipment suitable for displaying visual images.

Server 501 and computing device 560 may receive content item and data via input/output (hereinafter "I/O") circuitries 508 and 516, respectively. Although, I/O circuitries are shown, some embodiments may include I/O paths coupled to the circuitries (e.g., network cards, transceivers etc.) For instance, I/O circuitry 516 is a circuitry that includes one or more of communication port configured to receive a live content item stream from server 501 and/or content item source 554 via a communication network 558. Storage 512 may be configured to buffer the received live content item stream for playback and display 520 may be configured to present the buffered content, navigation options, alerts, and/or the like via a primary display window and/or a secondary display window. I/O circuitries 508, 516 may provide content item (e.g., a live stream of content, broadcast programming, on-demand programming, Internet content, content item available over a local area network (LAN) or wide area network (WAN), and/or other content) and data to control circuitry 502, 510. Control circuitry 502, 510 may be used to send and receive commands, requests, and other suitable data using I/O circuitries 508, 516. I/O circuitries 508, 516 may connect control circuitry 502, 510 (and specifically processing circuitry 506, 514) to one or more communication circuitries (described below). I/O functions may be provided by one or more of these communication circuitries but are shown as single paths in FIG. 5 to avoid overcomplicating the drawing.

Figure 6:
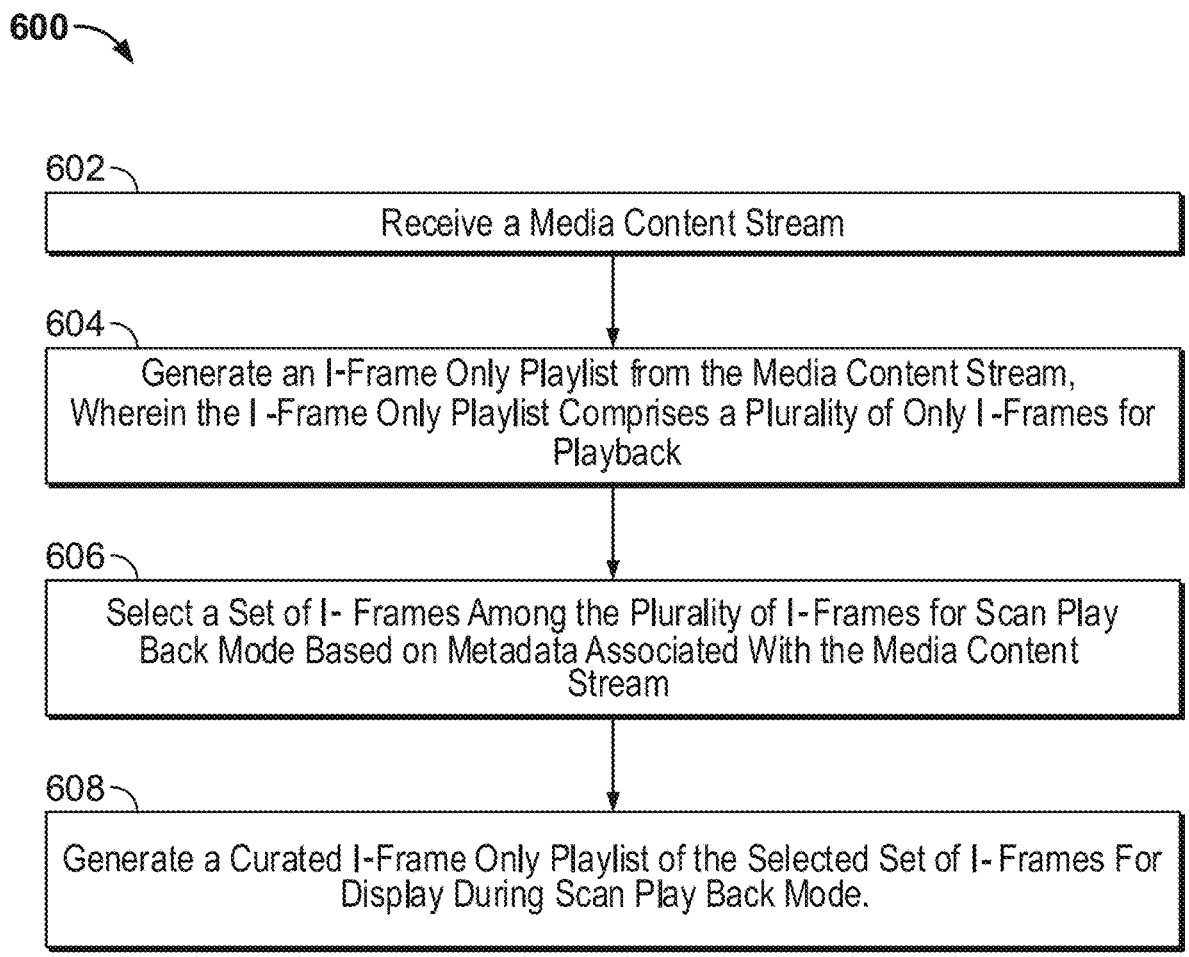
FIG. 6 depicts an illustrative flowchart of process for playback of streaming media content during a dual mode trick play operation, in accordance with some embodiments of the disclosure.

Having described systems 400 and 500, reference is now made to FIG. 6, which depicts an illustrative flowchart of process 600 for playback of streaming media content during a dual mode trick play operation that may be implemented by using systems 400, in accordance with some embodiments of the disclosure. In various embodiments, the individual steps of process 600 may be implemented by one or more components of systems 400 and 500.

Although the present disclosure may describe certain steps of process 600 (and of other processes described herein) as being implemented by certain components of systems 400 and 500, this is for purposes of illustration only, and it should be understood that other components of systems 400 and 500 may implement those steps instead. For example, steps of process 600 may be executed by server 501 and/or by computing device 560 to provide playback of streaming media content during a dual mode trick play operation.

At step 602, I/O circuitry (e.g., I/O circuitry 508 of FIG. 5) receives a media content stream at a device. In one example, the device is Server 1 as shown in FIG. 1. Media content stream may refer to any type of media content constantly received by and presented to a user while being delivered by a provider. Some examples of media include any kind of video, audio, text, or multimedia content, or any combination thereof. In one embodiment, the I/O circuitry receives the media via an API from a server (e.g., server 501) or from a media content item guidance data source (e.g., content item guidance data source 556). For example, I/O circuitry may access a screen (e.g., provide input for the algorithms) or database and receive media content via communications network (e.g., network 558). In one embodiment, the server 501 may store the media content locally in storage 505.

At step 604, control circuitry generates an I-frame only playlist from the media content stream. In one embodiment, the I-frame only playlist comprises a plurality of only I-frames for playback. In one embodiment, the media content stream is a source playlist comprising a plurality of I-frames and corresponding B and P frames. In one embodiment, control circuitry functions as a decoder by decoding selected frames in the source playlist. In one embodiment, the control circuitry discards the B-frames and the P-frames to generate an I-frame only playlist including only the I-frames. At step 606, control circuitry selects a set of I-frames among the plurality of I-frames for scan play back mode based on metadata associated with the media content stream. In one embodiment, the metadata includes data corresponding to media content. Some examples of metadata includes identification of frames associated with a scene change in media content, identification of frames associated with advertisements in the media content, identification of frame associated with time intervals in the media content, size of the frames of the media content, and random frames of the media content. At step 608, control circuitry generates a curated I-frame only playlist of the selected set of I-frames for display during scan play back mode. In one embodiment, each of the selected set of I-frames are downloaded to be displayed on a user device during scan play back mode.

Figure 7:
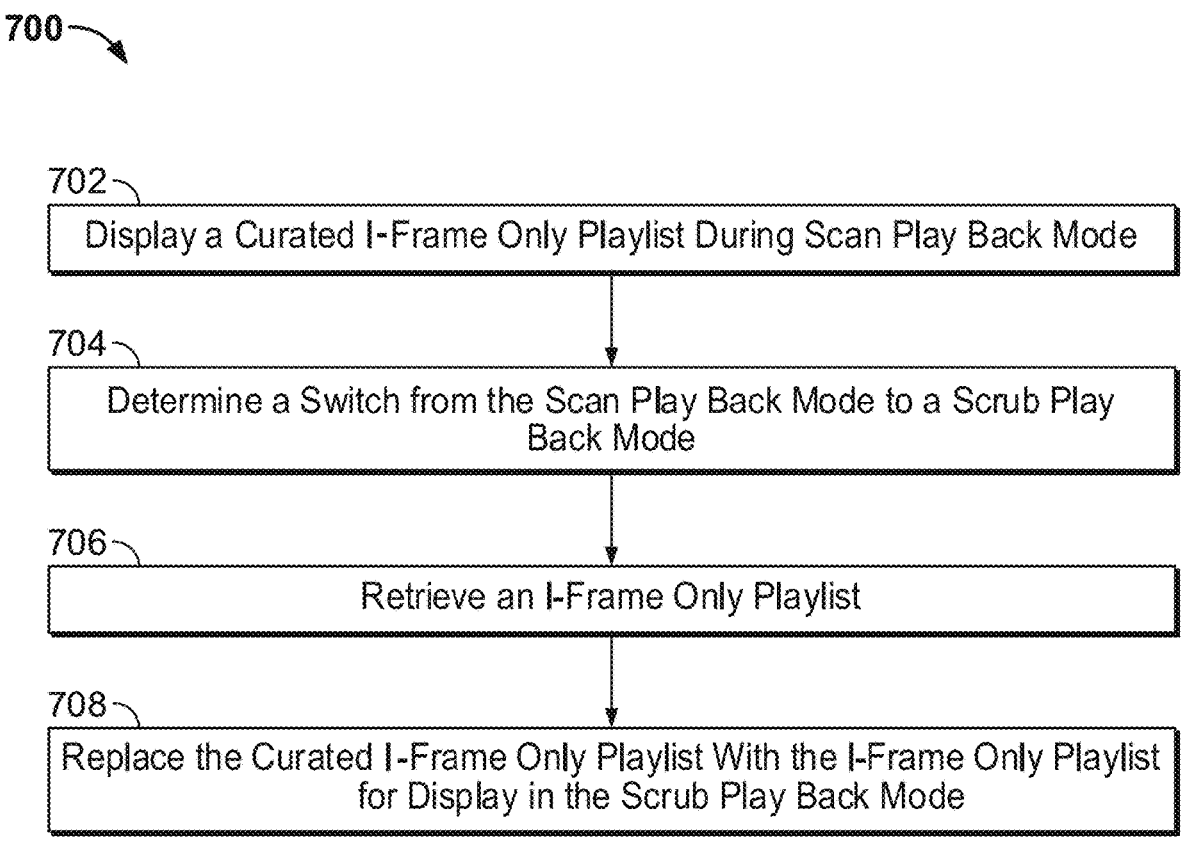
FIG. 7 depicts an illustrative flowchart of process for playback of streaming media content during a dual mode trick play operation, in accordance with some embodiments of the disclosure.

FIG. 7 depicts an illustrative flowchart of process 700 for playback of streaming media content during a dual mode trick play operation that may be implemented by using systems 400 and 500, in accordance with some embodiments of the disclosure. In various embodiments, individual steps of process 700 may be implemented by one or more components of systems 400 and 500. Although the present disclosure may describe certain steps of process 700 (and of other processes described herein) as being implemented by certain components of systems 400 and 500, this is for purposes of illustration only, and it should be understood that other components of systems 400 and 500 may implement those steps instead. For example, steps of process 700 may be executed by server 501 and/or by computing device 560. In some embodiments, the control circuitry 510 may use process 700 as part of process 600 of FIG. 6 (e.g., in addition to steps 602-608).

At step 702, control circuitry displays a curated I-frame only playlist during scan play back mode. As discussed above, the curated I-frame only playlist includes selected I-frames among a plurality of I-frames in I-frame only playlist. At step 704, the control circuitry determines a switch from the scan play back mode to a scrub play back mode. In one embodiment, the switch is determined when the user releases the progress bar and system automatically fast forwards/fast reverses the video. At step 706, the control circuitry retrieves an I-frame only playlist. As discussed above, the I-frame only playlist includes all the I-frames. At step 708, the control circuitry replaces the curated I-frame only playlist with the I-frame only playlist for display in the scrub play back mode.

Figure 8:
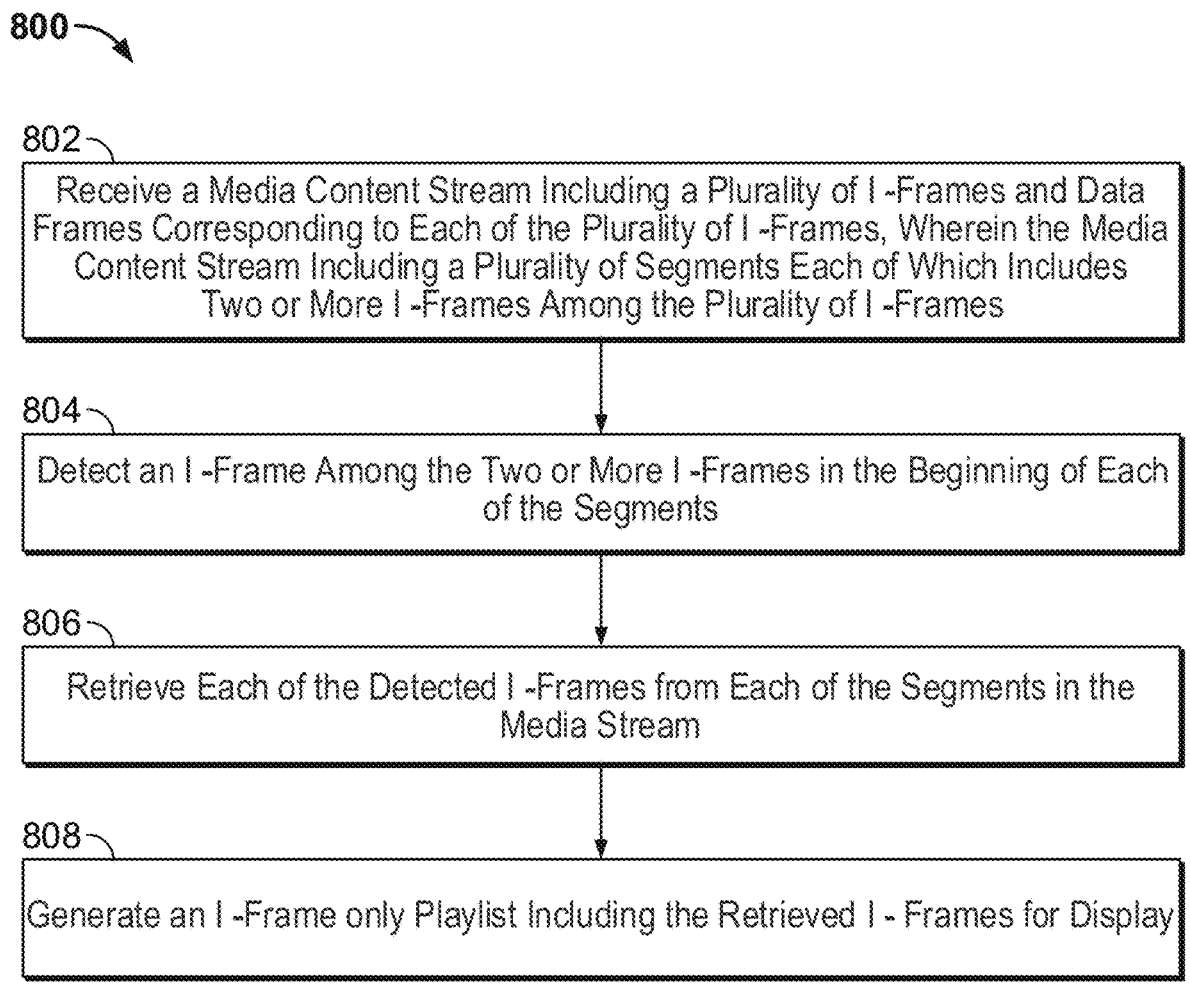
FIG. 8 depicts an illustrative flowchart of process for playback of streaming media content during scan mode trick play operation, in accordance with some embodiments of the disclosure.

FIG. 8 depicts an illustrative flowchart of process 800 for playback of streaming media content during scan mode playback operation that may be implemented by using systems 400 and 500, in accordance with some embodiments of the disclosure. In various embodiments, individual steps of process 800 may be implemented by one or more components of systems 400 and 500. Although the present disclosure may describe certain steps of process 800 (and of other processes described herein) as being implemented by certain components of systems 400 and 500, this is for purposes of illustration only, and it should be understood that other components of systems 400 and 500 may implement those steps instead. For example, steps of process 800 may be executed by server 501 and/or by computing device 560.

At step 802, control circuitry receives a media content stream including a plurality of I-frames and data frames corresponding to each of the plurality of I-frames, wherein the media content stream including a plurality of segments each of which includes two or more I-frames among the plurality of I-frames. In one embodiment, the media content stream is a source playlist comprising a plurality of I-frames and corresponding B and P frames. The source playlist includes multiple segments each of which include at least two or more I-frames and corresponding B and P frames. At step 804, the control circuitry detects an I-frame among the two or more I-frames in the beginning of each of the segment. In one embodiment, the control circuitry accesses source playlist metadata to detect the I-frame in the beginning of each segment. The source playlist metadata includes addressees of each of the segments in the source playlist and an identifier assigned to each of the I-frames that indicates all segments must begin with an I-Frame. In one embodiment, the control circuitry fetches for the identifier in each of the segments. At step 806, the control circuitry retrieves each of the detected I-frames from each of the segments in the media stream. At step 808, the control circuitry, generates an I-frame only playlist including the retrieved I-frames for display. In one embodiment, the control circuitry discards all the B and P frames corresponding to the detected I-frames. In one embodiment, the control circuitry discards all other I-frames that are not identified at the beginning of the segment and B and P frames corresponding to the other frames.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The above-described embodiments of the present disclosure are presented for purposes of illustration and not of limitation, and the present disclosure is limited only by the claims that follow. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method comprising:
   determining a plurality of scene changes in a media content stream;
   identifying an I-frame for each respective beginning of a scene change, of the plurality of scene changes, in the media content stream;
   generating, using one or more servers and based on metadata associated with the media content stream, an I-frame only playlist that includes only the identified I-frame for each respective beginning of a scene change in the media content stream, wherein the I-frame only playlist is for a trickplay mode, and wherein the generating of the I-frame only playlist using the one or more servers comprises discarding frames of the media content stream other than the identified I-frames; and
   based at least in part on receiving a request to enter the trickplay mode from a client device accessing the media content stream, causing the client device to enter the trickplay mode, wherein the trickplay mode is performed based at least in part on the I-frame only playlist.

2. The method of claim 1, wherein identifying the I-frame for each respective beginning of a scene change is based at least in part on determining the I-frame is associated with an assigned identifier.

3. The method of claim 1, further comprising:
   identifying I-frames associated with both the beginning of each respective scene change and ending of each respective scene change; and
   wherein the discarding further comprises discarding I-frames associated with the endings of the plurality of scene changes.

4. The method of claim 1, further comprising:
 causing display at the client device of an indication of the trickplay mode;
 curating the generated I-frame only playlist; and
 rendering the I-frame only playlist at a high speed playback regardless of a frame rate associated with the I-frame only playlist.

5. The method of claim 1, wherein generating the I-frame only playlist further comprises:
 transmitting the generated I-frame only playlist to a playlist generator;
 fetching, by the playlist generator, a source frame playlist associated with each I-frame in the I-frame only playlist; and
 retaining I-frames in the source frame playlist and discarding B frames and P frames associated with the I-frames.

6. The method of claim 1, wherein the trickplay mode comprises playing of the I-frame only playlist in a scrub play back mode.

7. The method of claim 6, further comprising, displaying a fast forward indicator during the scrub play back mode.

8. A computer-implemented method comprising:
 determining a plurality of scene changes in a media content stream;
 identifying an I-frame for each respective beginning of a scene change, of the plurality of scene changes, in the media content stream;
 generating, based on metadata associated with the media content stream, an I-frame only playlist that includes only the identified I-frame for each respective beginning of a scene change in the media content stream for a trickplay mode, wherein the trickplay mode comprises a scrub play back mode and a scan play back mode;
 based at least in part on receiving a request to enter the trickplay mode from a client device accessing the media content stream, causing the client device to enter the trickplay mode, wherein the trickplay mode is performed based at least in part on the I-frame only playlist;
 while the client device is in the trickplay mode, cause the client device to switch from the scrub play back mode to the scan play back mode; and
 based at least in part on the switching from the scrub play back mode to the scan play back mode, automatically fast forwarding the I-frame only playlist by skipping through a plurality of I-frames.

9. The method of claim 1, wherein the trickplay mode comprises playing of the I-frame only playlist in a scan play back mode.

10. A system comprising:
 input/output (I/O) circuitry configured to:
  identify a media content stream; and
 one or more servers comprising control circuitry communicably coupled to the I/O circuitry, wherein the control circuitry is configured to:
  determine a plurality of scene changes in a media content stream;
  identifying an I-frame for each respective beginning of a scene change, of the plurality of scene changes, in the media content stream;
  generate, based on metadata associated with the media content stream, an I-frame only playlist that includes only the identified I-frame for each respective beginning of a scene change in the media content stream, wherein the I-frame only playlist is for a trickplay mode, and wherein the control circuitry is further configured to, when generating the I-frame only playlist, discard frames of the media content stream other than the identified I-frames; and
  based at least in part on receiving a request to enter the trickplay mode from a client device accessing the media content stream, causing the client device to enter the trickplay mode, wherein the trickplay mode is performed based at least in part on the I-frame only playlist.

11. The system of claim 10, wherein the control circuitry is further configured to identify the I-frame for each respective beginning of a scene change based at least in part on determining the I-frame is associated with an assigned identifier.

12. The system of claim 10, wherein:
 the control circuitry is further configured to:
  identify I-frames associated with both the beginning of a scene change and ending of the scene change; and
 the control circuitry is further configured to, when performing the discarding, discard I-frames associated with the endings of the plurality of scene changes.

13. The system of claim 10, wherein the control circuitry is further configured to:
 cause display at the client device of an indication of the trickplay mode;
 curate the generated I-frame only playlist; and
 render the I-frame only playlist at a high speed playback regardless of a frame rate associated with the I-frame only playlist.

14. The system of claim 10, wherein the control circuitry is further configured to:
 transmit the generated I-frame only playlist to a playlist generator;
 fetch a source frame playlist associated with each I-frame in the I-frame only playlist; and
 retain I-frames in the source frame playlist and discard B frames and P frames associated with the I-frames.

15. The system of claim 10, wherein the trickplay mode comprises playing of the I-frame only playlist in a scrub play back mode.

16. The system of claim 15, wherein the control circuitry is further configured to cause display of a fast forward indicator during the scrub play back mode.

17. The system of claim 15, wherein the control circuitry is further configured to:
 while the client device is in the trickplay mode, cause the client device to switch from the scrub play back mode to a scan play back mode; and
 based at least in part on the switching from the scrub play back mode to the scan play back mode, automatically fast forward the I-frame only playlist, wherein the control circuitry configured to, when fast forwarding the I-frame only playlist, skip through a plurality of I-frames.

18. The system of claim 10, wherein the trickplay mode comprises playing of the I-frame only playlist in a scan play back mode.

19. The method of claim 8, wherein the discarding further comprises discarding each P frame and each B frame associated with the media content stream.

20. The method of claim 19, wherein the discarding further comprises discarding each I-frame associated with the media content stream that is not one of the identified I-frames.

* * * * *